Patented May 11, 1943

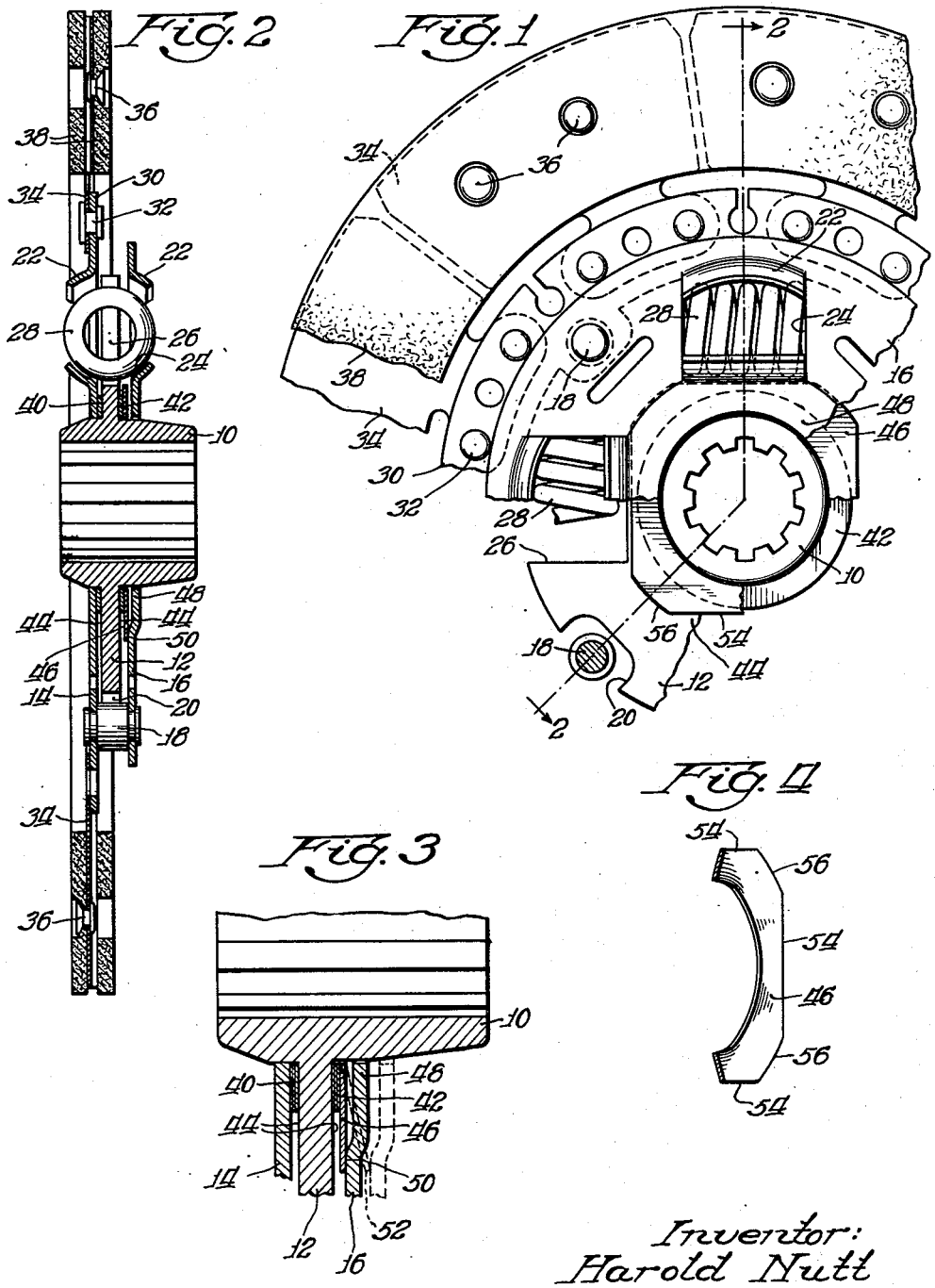

2,318,620

UNITED STATES PATENT OFFICE 2,318,620

FRICTION CLUTCH

Harold Nutt, Chicago, Ill., assignor to Borg-Warner Corporation, Chicago, Ill., a corporation of Illinois Application January 16, 1942, Serial No. 426,935

7 Claims. (Cl. 192—68)

This invention relates to friction clutch plates, and has as its object to provide an improved torsional vibration dampening means in a clutch plate.

More particularly, the invention is directed to the type of vibration dampening mechanism shown in my pending application Serial No. 387,801, in which a Belleville washer spring is employed to develop braking engagement between the friction washer and a cooperating member, such as a hub flange, against which the washer is brakingly engaged. In the mechanism shown in that application, the Belleville washer spring serves merely as a means for developing resilient axial pressure, and a pressure plate is interposed between the Belleville spring and the adjacent friction washer, the pressure plate being provided with a finger extending through the Belleville spring and engaging the adjacent housing plate, so that the pressure plate may be held against rotation with reference to the housing plate.

The primary object of the present invention is to simplify that construction. To this end, the invention contemplates the elimination of the pressure plate, and stressing the washer spring to just the right extent to develop full surface to surface braking contact between the washer spring and the adjacent friction washer, whereby the spring not only maintains its previous function of providing the axial pressure for developing braking engagement between the friction surfaces, but also the additional function of coacting with the adjacent friction washer to provide one of the pairs of braking surfaces.

Another object of the invention is to provide, in a torsional vibration dampening mechanism in which a Belleville washer type spring is interposed in series with a friction washer or washers between the hub flange and a housing plate, a form of spring which is by reason of a non-circular periphery, adapted to coact with the cushioning spring of the plate so as to be held against rotation with reference to the adjacent housing plates.

Other objects, the advantages and uses of the invention will become more apparent after reading the following specification and claims and after consideration of the drawing forming a part of the specification, wherein:

Fig. 1 is an elevation of a portion of a clutch plate embodying my invention;

Fig. 2 is an axial sectional view thereof;

Fig. 3 is an enlarged detailed sectional view of the braking mechanism; and

Fig. 4 is a perspective view of a portion of the washer spring.

As an example of one form in which the invention may be embodied, I have shown in the drawing a clutch plate comprising a hub 10 having a radial flange 12 embraced between a pair of spring housing plates 14 and 16. The housing plates 14 and 16 are secured together by rivets 18 which extend through notches 20 in the periphery of the hub flange 12, and are formed with spring retaining shrouds 22 defining spring openings 24 registering with complementary spring openings or notches 26 in the hub flange 12. In the openings 24 and 26 are seated springs 28 the ends of which are adapted to engage the edges of the housing plates 14 and 16 and of the flange 12 defining the openings 24 and 26, so as to form a sectional cushioning torque transmitting connection between the hub and the housing plates.

The housing plate 14 is extended as at 30 to form a facing carrying disc to which are riveted, at 32, a plurality of yieldable facing mounting cushions 34. To the facing mounting cushions 34 are riveted, at 36, a pair of facings 38.

Torsional vibration tending to develop between the hub 10 and the facing carrying disc 30 is absorbed by mechanism comprising friction washers 40 and 42 having braking engagement with friction faces 44 on the respective sides of the hub flange 12. The washer 40 also has braking engagement with one of the spring housing plates 14, 16. In the arrangement shown, this engagement is with facing carrying plate 14.

The friction washers 40 and 42 receive the hub 10 fairly snugly so as to be maintained in concentric relationship thereto. Between the friction washer 42 and the housing plate 16 is interposed a Belleville washer type spring 46, the inner portion of which has direct braking contact with the other face of the washer 42, and the outer portion of which is in abutting engagement with the housing plate 16. The inner portion of the housing plate 16 is offset axially away from the washer spring 46 as at 48, the offset defining a shoulder 50 against which the peripheral portion of washer spring 46 is seated, the remainder of the spring 46 being thus spaced from the housing plate 16 so as to restrict the packing pressure in the dampening means to that which is developed by stressing the washer spring 46.

I have referred to the washers 40 and 42 as though only one washer were employed on each side of the flange 12, and Fig. 2, because of the scale to which it is drawn, only shows a single washer on each side of the flange. Actually, I prefer to employ a plurality of washers in series on each side of the flange as disclosed in Fig. 3 in accordance with the invention set forth in my application Serial No. 348,085, filed July 29, 1940, and issued as Patent No. 2,277,558 on March 24, 1942. However, it is to be understood that it is possible to employ the present invention in connection with a single frictional washer on each side of the hub flange.

Referring now to Fig. 3, the washer spring 46 is of the general type commonly known as a "Belleville washer spring," its normal unstressed form being indicated in dotted lines at 52 in Fig. 3. The present invention contemplates the stressing of the spring from this form, in which its contact with the washer 42 would be restricted to a circular line contact at the inner edge of the spring, to a flat plane in which it has full surface to surface contact with the outer face of the outer washer 42. This engagement between the washer spring and the friction washer provides one of the pair of braking surfaces of the dampening means.

Utilization of this pair of braking surfaces is assured by anchoring the washer spring 46 against rotation relative to the housing plate 16. While various means of thus anchoring the washer spring might be employed, the invention contemplates eliminating the use of rivets, lugs, etc. in order to simplify the construction. To this end, the periphery of the spring is cut away to provide straight sides 54 defining between them corners 56 which project between adjacent cushion springs 28 and are adapted to engage the springs in the event of any tendency of the washer spring to rotate relative to the housing plate.

I claim:

1. In a friction clutch, a hub having a radial flange, a pair of annular spring housing plates, one of which is adapted to support friction facings, secured together one on either side of said flange, said plates and flange having registering openings, springs seated in said openings and collectively forming a sectional cushion between said hub and plates, and torsional vibrational dampening means comprising a friction washer and a Belleville washer spring interposed in series between said flange and one of said plates, said washer spring being in direct contact with said friction washer and stressed from its normally conical form capable of having only a circular line contact with said friction washer at one of its edges, to a form in which it has full surface to surface contact with said friction washer, whereby to provide one of the pairs of braking surfaces of said dampening means and at the same time to provide the resilient axial pressure for developing the braking action.

2. In a friction clutch, a hub having a radial flange, a pair of annular spring housing plates, one of which is adapted to support friction facings, secured together one on either side of said flange and oscillatably receiving said hub, said plates and flange having registering openings, springs seated in said openings and collectively forming a sectional cushion between said hub and flange, one of said plates having an inner region offset axially away from said flange to provide a shoulder, and torsional vibration dampening means comprising a friction washer and a Belleville washer type spring interposed in the order named between said flange and said one plate, the inner portion of said spring being in direct contact with said friction washer and axially spaced from said offset inner region of the plate and the outer periphery of said washer spring being in abutting contact with said shoulder, said washer spring being stressed from its normally conical form capable of having only a circular line contact with said friction washer at its inner edge, to a flat form in which it has full surface to surface contact with said friction washer, whereby to provide one of the pairs of braking surfaces of said dampening means and at the same time to provide yielding axial pressure for developing the braking action.

3. In a friction clutch plate, a hub having a radial flange providing a flat friction surface, a pair of annular spring housing plates, one of which is adapted to support friction facings, secured together, one on either side of said flange, said plates and flange having registering openings, springs seated in said openings and collectively forming a sectional cushion between said hub and plates, and torsional vibration dampening means comprising a thin flat friction washer snugly receiving said hub and in frictional braking engagement with said flat flange surface, and a Belleville washer spring interposed between said friction washer and one of said plates with the inner portion of said spring in direct braking contact with said friction washer and the perphery thereof in abutting contact with said one plate, in a region radially outwardly of the periphery of said friction washer, said washer spring being stressed from its normally conical form capable of having only a circular line contact with said friction washer at its inner edge, to a flat form in which it has full surface to surface contact with said friction washer, whereby to provide one of the pairs of braking surfaces of said dampening means and at the same time to provide resilient pressure for developing the braking action.

4. In a friction clutch, a hub having a radial flange provided on one side adjacent the hub with a flat friction surface, a pair of annular spring housing plates secured together one on either side of said flange, said plates and flange having registering openings, springs seated in said openings and collectively forming a sectional cushion between said hub and plates, and torsional vibration dampening means comprising a plurality of thin flat friction washers and a Belleville washer spring interposed in series in the order named between said flange and one of said plates, said friction washers being piloted upon the hub with the inner washer in braking contact with said flange surface and the outer washer in direct braking contact with the inner portion of said washer spring, the outer portion of said washer spring projecting radially beyond said washers and being in abutting contact with said one plate, said washer spring being stressed from its normally conical form capable of having only a circular line contact with said outer friction washer at its inner edge, to a flat form in which it has full surface to surface contact with the outer face of said outer friction washer, whereby to provide one of the pairs of braking surfaces of said dampening means and at the same time to provide resilient axial pressure for developing the braking action between all of the friction surfaces.

5. In a friction clutch plate, a pair of annular members, one of which is adapted to carry friction facings and a hub having a radial flange member, said pair of members comprising spring housing plates secured together one on either side of the third member and being provided with registering windows, springs seated in said windows and collectively forming a sectional cushion between said hub and facing carrying member, and torsional vibration dampening means interposed between another two of said members, said dampening means including a friction washer and a Belleville washer spring interposed in series between said other two members, said washer spring having a non-circular periphery adapted to interengage with said cushion springs so as to hold said washer spring against rotation relative to said other two members.

6. In a friction clutch plate, a pair of annular members, one of which is adapted to carry friction facings and a hub having a radial flange member, said pair of members comprising spring housing plates secured together one on either side of the third member and being provided with registering windows, springs seated in said windows and collectively forming a sectional cushion between said hub and facing carrying member, and torsional vibration dampening means interposed between another two of said members, said dampening means including a friction washer and a Belleville washer spring interposed in series between said other two members, said washer spring being roughly polygonal in shape, with corner portions extending between adjacent cushioning springs and adapted to engage the same for holding said washer spring against rotation relative to said other two members.

7. In a friction clutch plate, a hub having a radial flange member, an annular member adapted to be associated in torsionally fixed relationship to a friction facing, and torsional vibration dampening means interposed between said members, said dampening means including a friction washer and a Belleville washer spring interposed in series between said members, said washer spring being in direct braking contact with said friction washer and stressed from its normally conical shape capable of having only a circular line contact with said friction washer at one of its edges, to a form in which it has full surface to surface contact with said friction washer, whereby to provide one of the pairs of braking surfaces of said dampening means and at the same time to provide resilient axial pressure for developing the braking action.

HAROLD NUTT.